(12) United States Patent
Kashiwagi

(10) Patent No.: US 9,033,083 B2
(45) Date of Patent: May 19, 2015

(54) PROTECTIVE STRUCTURE FOR VEHICLE ELECTRICAL COMPONENTS

(75) Inventor: Katsufumi Kashiwagi, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 13/460,376

(22) Filed: Apr. 30, 2012

(65) Prior Publication Data

US 2012/0286541 A1 Nov. 15, 2012

(30) Foreign Application Priority Data

May 9, 2011 (JP) ................................. 2011-104063

(51) Int. Cl.
| | |
|---|---|
| *B60L 11/18* | (2006.01) |
| *B60K 1/00* | (2006.01) |
| *B60K 1/04* | (2006.01) |
| *H01M 2/10* | (2006.01) |
| *H01M 10/0525* | (2010.01) |
| *H01M 10/46* | (2006.01) |

(52) U.S. Cl.
CPC ......... *B60L 11/1825* (2013.01); *B60L 11/1816* (2013.01); *B60K 1/00* (2013.01); *B60K 1/04* (2013.01); *B60K 2001/003* (2013.01); *H01M 2/1083* (2013.01); *H01M 10/0525* (2013.01); *H01M 10/46* (2013.01); *Y02T 10/7005* (2013.01); *Y02T 90/121* (2013.01); *Y02T 90/14* (2013.01); *Y02T 90/128* (2013.01); *Y02T 10/7011* (2013.01)

(58) Field of Classification Search
CPC .................................. B60R 16/04; B60K 1/04
USPC ...................... 296/193.07, 208, 136.04, 24.3; 180/68.5
See application file for complete search history.

(56) References Cited

U.S. PATENT DOCUMENTS

| | | | | |
|---|---|---|---|---|
| 4,216,990 | A * | 8/1980 | Musgrove et al. | ............ 296/213 |
| 8,056,966 | B2 * | 11/2011 | Edwards et al. | ............. 296/208 |
| 2006/0016633 | A1 | 1/2006 | Fujii et al. | |

FOREIGN PATENT DOCUMENTS

| | | |
|---|---|---|
| JP | 2006-035915 | 2/2006 |
| JP | 2007-331719 | 12/2007 |

* cited by examiner

*Primary Examiner* — Glenn Dayoan
*Assistant Examiner* — Melissa A Black
(74) *Attorney, Agent, or Firm* — Silicon Valley Patent Group LLP

(57) ABSTRACT

Provided is a protective structure for vehicle electrical components that can prevent the infiltration of water from above and more reliably protect electrical components (high-voltage electrical components). As a representative configuration of the present invention, a protective structure for vehicle electrical components for protecting an electrical component mounted on the vehicle floor panel includes a lid that covers the electrical component from above, and a front panel, rear panel, and pair of side panels that are arranged around the lid and parallel to an upper face of the lid, and the panels have gutter-shaped edges that support the periphery of the lid.

14 Claims, 8 Drawing Sheets

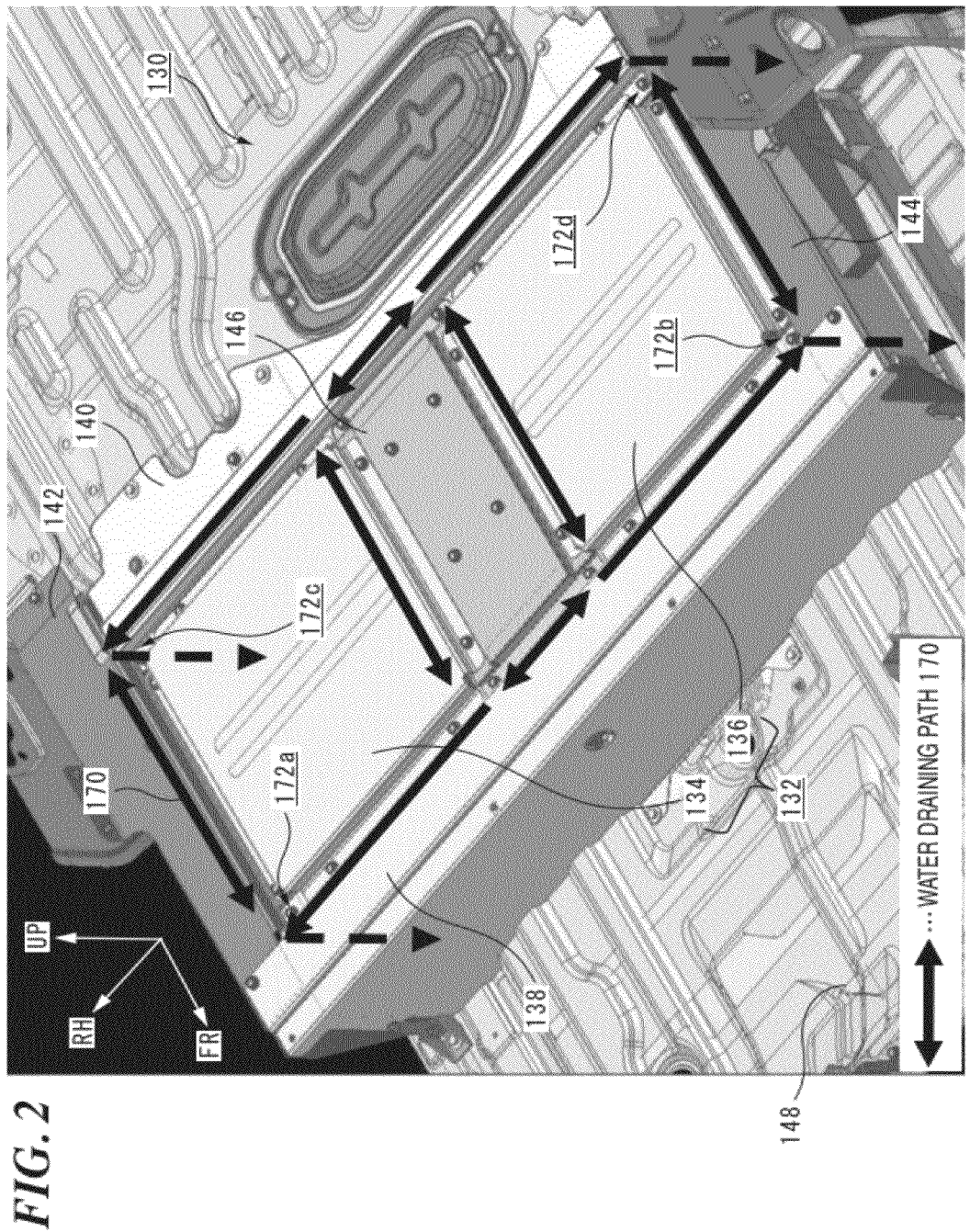

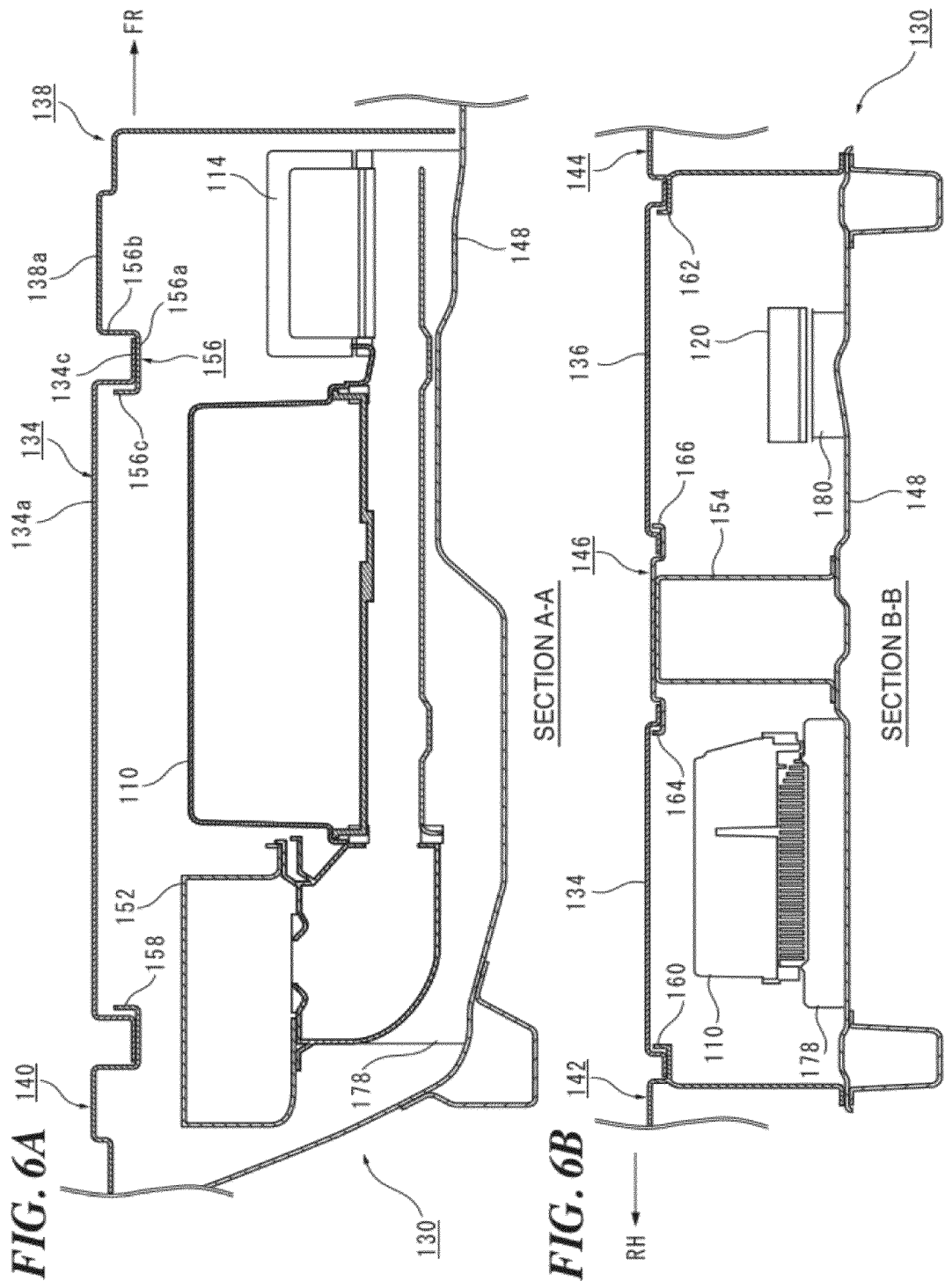

PROTECTIVE STRUCTURE FOR VEHICLE ELECTRICAL COMPONENTS

CROSS-REFERENCE TO RELATED APPLICATIONS

This application is based upon and claims the benefit of priority from the prior Japanese Patent Application No. 2011-104063, filed on May 9, 2011, the entire contents of which are incorporated herein by reference.

BACKGROUND

I. Field of the Invention

The present invention relates to a protective structure for vehicle electrical components for protecting electrical components mounted on the vehicle floor.

II. Background

The vehicle industry is facing a departure from oil out of concern for the depletion of oil resources and global warming, and the focus of development has been shifting toward electric vehicles (EVs) as well as hybrid electric vehicles (HEVs) and plug-in hybrid electric vehicles (PHEVs). These vehicles can travel without emitting exhaust gas since their motors are driven by power stored in a high-voltage battery (lithium-ion secondary battery).

At present, these vehicles often employ a configuration in which high-voltage electrical components such as a charger, a DC/DC converter, an EV controller, and a high-voltage battery are disposed on the vehicle floor in the vicinity of the rear seat. For example, in Japanese Patent Laid-Open Publication No. 2007-331719, a floor panel constituting a vehicle floor is provided with a recessed part, and a battery is disposed in the recessed part.

High-voltage electrical components may stop functioning if they are exposed to water, and therefore examination is underway on technology for preventing water exposure. For example, in Japanese Patent Laid-Open Publication No. 2007-331719, the recessed part provided in the floor panel is provided with a water draining hole so as to suppress a situation in which water that has entered the recessed part infiltrates the battery.

However, merely providing a water draining hole as disclosed in Japanese Patent Laid-Open Publication No. 2007-331719 does not enable preventing high-voltage electrical components from being exposed to water infiltrating from above. In particular, DC/DC converters and EV controllers may stop functioning due to the adhesion of water droplets that have fallen from above, and other high-voltage electrical components may also stop functioning if they become submerged due to water infiltrating from above.

The present invention has been achieved in light of the above-described problem, and an object thereof is to provide a protective structure for vehicle electrical components that can prevent the infiltration of water from above and reliably protect an electrical component (high-voltage electrical component).

BRIEF SUMMARY

A representative configuration of the present invention for solving the above-described problem is a protective structure for vehicle electrical components for protecting an electrical component mounted on a vehicle floor, the protective structure for vehicle electrical components including: a lid that covers the electrical component from above; and one or more panels that are arranged around the lid and parallel to an upper face of the lid, wherein the one or more panels each have a gutter-shaped edge that supports the periphery of the lid.

According to this configuration, water from above is obstructed by the lid, and that water flows to gutter-shaped edges that extend along the periphery of the lid. That water can then be drained via the gutter-shaped edges at trouble-free positions not directly above an electrical component. This enables preventing the infiltration of water from above and reliably protecting the electrical component.

The protective structure for vehicle electrical components may include two or more of the panels, and the gutter-shaped edges may have a water draining opening in a portion where the panels join together.

According to this configuration, water draining openings of the gutter-shaped edges are set in portions where the panels join together, and water that has flowed to the gutter-shaped edges is drained downward from these positions. The portions where the panels join together are at positions separated away from the region directly above the electrical component, thus enabling reliably preventing the electrical component from being exposed to water from above. Note that the water draining openings of the gutter-shaped edges can be set in the portions where the panels join together without leading to unnecessary enlargement in terms of the layout.

The lid may be substantially quadrangular in a plan view, and included among the one or more panels may be a front panel having a gutter-shaped edge that extends in a vehicle width direction along a front end of the lid, a rear panel having a gutter-shaped edge that extends in the vehicle width direction along a rear end of the lid, and a pair of side panels each having a gutter-shaped edge that extends in a vehicle front/rear direction along a side end of the lid.

According to this configuration, water from above that has been obstructed by the lid can be drained to trouble-free positions not directly above the electrical component via the gutter-shaped edge of the front panel that extends along the front end of the lid, the gutter-shaped edge of the rear panel that extends along the rear end of the lid, and the gutter-shaped edges of the pair of side panels that extend along the side ends of the lid.

The lid may have side faces on four sides of the upper face, and attachment faces that extend outward parallel to the upper face from lower ends of the side faces, and the gutter-shaped edges of the one or more panels may be fixed so as to be layered underneath the attachment faces of the lid.

According to this configuration, the gutter-shaped edge of the front panel that extends along the front end of the lid, the gutter-shaped edge of the rear panel that extends along the rear end of the lid, and the gutter-shaped edges of the pair of side panels that extend along the side ends of the lid are fixed so as to each be layered underneath the attachment faces of the lid. This enables reliably directing the water obstructed by the lid to the gutter-shaped edges.

The lid may include two sub lids that are arranged in the vehicle width direction, the two sub lids may each have an upper face, side faces on four sides of the upper face, and attachment faces that extend outward parallel to the upper face from lower ends of the side faces, the protective structure for vehicle electrical components may further include a center panel, the center panel having two gutter-shaped side ends that extend in the vehicle front/rear direction and are layered underneath the inner attachment faces of the two sub lids, and front and rear attachment faces having shapes substantially the same as the front and rear attachment faces of the two sub lids, and the gutter-shaped edges of the one or more panels may be fixed so as to be layered underneath the attachment faces of the two sub lids and the center panel.

According to this configuration, the electrical component can be inspected and repaired by removing only whichever one of the two sub lids needs to be removed. This enables improving workability in inspection and repair. The center panel having two gutter-shaped side ends that extend in the vehicle front/rear direction is provided between the two sub lids, and the two gutter-shaped side ends are fixed so as to be layered underneath the inner attachment faces of the two sub lids. Accordingly, water that has flowed to the inner sides of the two sub lids can be drained to trouble-free positions not directly above the electrical component via the two gutter-shaped side ends of the center panel.

The lid, the front panel, the rear panel, the pair of side panels, and the center panel may be formed from a metal material, and the protective structure for vehicle electrical components may further include a stiffener that is disposed on the vehicle floor and supports the center panel.

This configuration enables raising the strength of the lid, the front panel, the rear panel, the pair of side panels, and the center panel, so as to ensure durability with respect to the load that they are subjected to from above.

The protective structure for vehicle electrical components may further include a base part that supports the electrical component so as to be at a position higher than the vehicle floor.

This configuration enables avoiding the situation in which the electrical component is exposed to water, even if the water level were to reach the vehicle floor in the vicinity of the electrical component.

The vehicle may be an electric automobile, a hybrid electric vehicle, or a plug-in hybrid electric vehicle, and the electrical component may be a high-voltage electrical component that operates using high voltage for motor driving.

This configuration enables reliably protecting a high-voltage electrical component that contributes to the traveling function of the vehicle.

With the present invention, water infiltrating from above toward an electrical component mounted on the vehicle floor is obstructed by a lid, and that water is drained to trouble-free positions not directly above the electrical component via the gutter-shaped edges of panels that extend along the periphery of the lid. This enables preventing the infiltration of water from above and reliably protecting the electrical component.

In particular, high-voltage electrical components in EVs, HEVs, and PHEVs contribute to the traveling function of vehicles. In other words, if such a high-voltage electrical component is exposed to water and stops functioning, the vehicle may no longer be able to travel. The application of the present invention is therefore highly effective in improving product reliability. This therefore enables promoting the adoption of vehicles employing such motors (electric motors).

According to some aspects, disclosed is a protective structure for vehicle electrical components for protecting an electrical component mounted on a vehicle floor, the protective structure for vehicle electrical components comprising: a lid that covers the electrical component from above; and one or more panels that are arranged around the lid and parallel to an upper face of the lid; wherein the one or more panels each have a gutter-shaped edge that supports the periphery of the lid.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

FIG. 2 is a diagram showing the protective structure for vehicle electrical components according to the embodiment.

FIGS. 6A and 6B are respectively a cross-sectional view taken along A-A and a cross-sectional view taken along B-B in FIG. 4A.

DETAILED DESCRIPTION

Figure 1A:
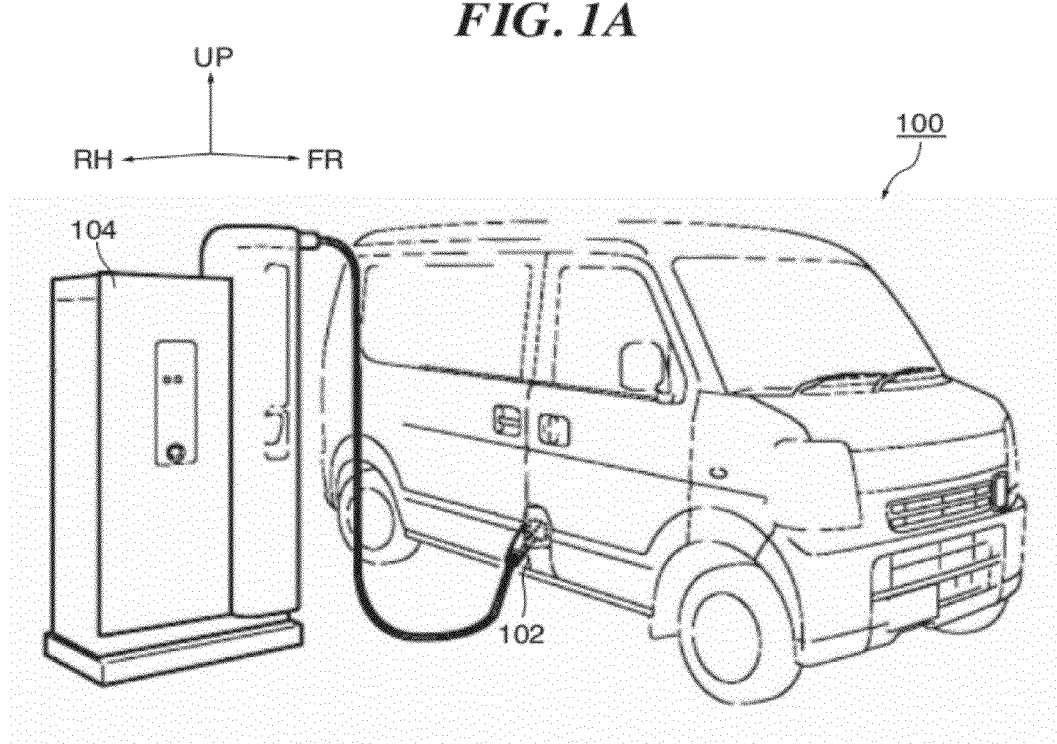
FIGS. 1A and 1B are diagrams showing a vehicle to which a protective structure for vehicle electrical components according to an embodiment of the present invention is applied.

Hereinafter, a detailed description of a preferred embodiment of the present invention will be given with reference to the accompanying drawings. The dimensions, materials, specific numerical values, and the like in this embodiment are merely examples for facilitating understanding of the invention, and are not intended to limit the present invention unless particularly specified otherwise. Note that in this specification and the drawings, the same reference signs will be given to elements that have substantially the same functions and configurations, redundant descriptions of such elements will not be given, and elements that are not directly related to the present invention are not shown in the drawings.

Figure 1B:
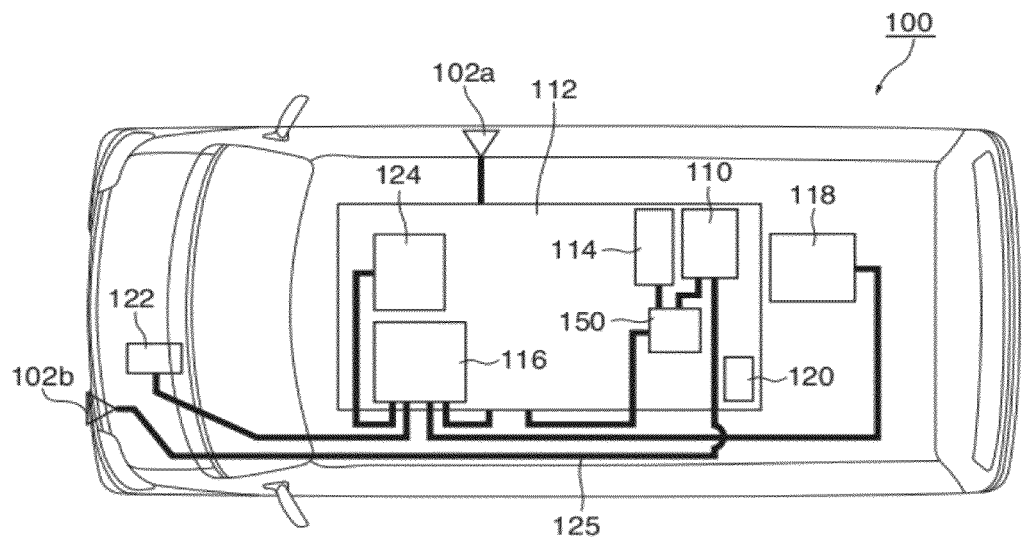

FIGS. 1A and 1B are diagrams showing a vehicle 100 to which a protective structure for vehicle electrical components according to the present embodiment is applied. FIG. 1A is an external view of the vehicle 100, and FIG. 1B is a conceptual diagram showing an EV system of the vehicle 100. Note that in the drawings, the arrow FR points toward the front of the vehicle, the arrow RH points toward the right side of the vehicle, and the arrow UP points toward the top of the vehicle. As shown in FIGS. 1A and 1B, the vehicle 100 is an electric automobile and is charged by opening a rapid charging opening 102a and a normal charging opening 102b and connecting an external power source 104. The rapid charging opening 102a is used for a rapid charge that is completed in a time shorter than a normal charge through the normal charging opening 102b requires.

As shown in FIG. 1B, the vehicle 100 includes a charger 110, a high voltage battery 112, a DC/DC converter 114, an inverter 116, a motor 118, a junction box 150, an EV controller 120, an electric A/C compressor 122, and a PTC heater 124. Power supplied from the external power source 104 is supplied to various parts by high-voltage cables 125.

The EV controller 120 performs control of the EV system (control of the motor 118, external charging control, and the like) based on information from sensors and controllers. The DC/DC converter 114 lowers high voltage for motor driving that reaches several hundred volts, supplies the lowered voltage to an auxiliary battery, and supplies power to controllers.

The inverter 116 receives signals from the EV controller 120, sensors built into the motor 118, and the like, and changes the torque of the motor 118 so as to be optimal or efficient. The electric A/C compressor 122 receives a control signal from the EV controller 120 and operates a motor inside the compressor 122 using high voltage power obtained from the inverter 116, in order to absorb, compress and exhaust a cooling agent. The PTC heater 124 heats water with the heat obtained by sending electric current into an element inside the PTC heater 124. The heated water is then circulated in a heater core for heating the inside of the vehicle. Fuses and high-voltage relays for the high-voltage battery system (high-voltage battery, DC/DC converter 114, and the like) are built into the junction box 150. The high voltage battery 112 may for example be a lithium-ion battery.

The vehicle 100, which is an electric automobile, cannot travel unless the EV system functions. High reliability is therefore required for the high-voltage electrical components that constitute the EV system and operate using high-voltage for driving the motor 118. However, the exposure of these high-voltage electrical components to water needs to be reliably prevented since they may stop functioning due to water exposure. Note that "water exposure" in this specification refers to exposure to a liquid rather than being limited to pure water.

Figure 3:
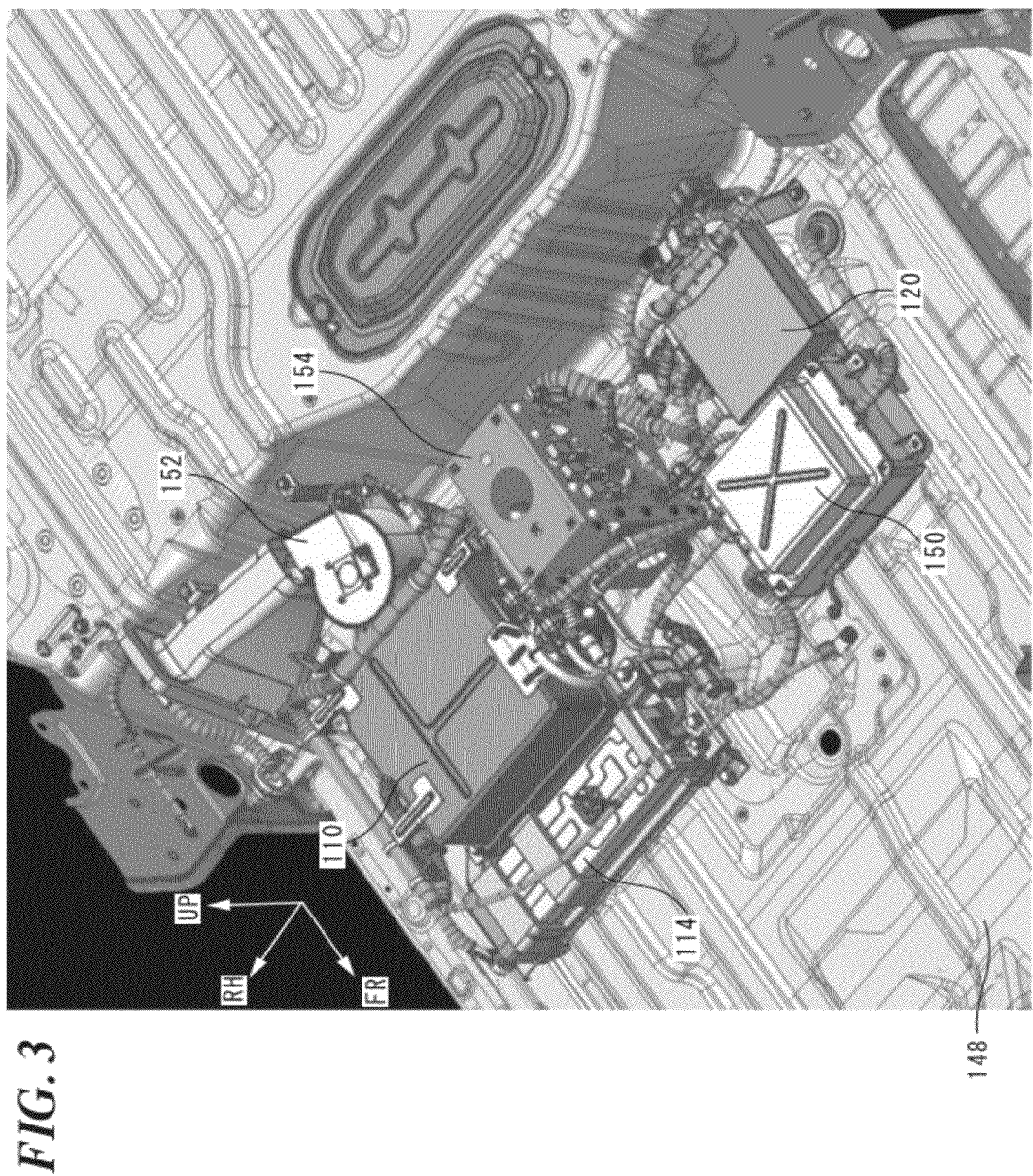
FIG. 3 is a diagram showing a state in which sub lids, a front panel, a rear panel, a pair of side panels, and a center panel shown in FIG. 2 have been removed.

FIG. 2 is a diagram showing the protective structure for vehicle electrical components (hereinafter, referred to as a "protective structure 130") according to the present embodiment. FIG. 3 is a diagram showing a state in which sub lids 134 and 136, a front panel 138, a rear panel 140, a pair of side panels 142 and 144, and a center panel 146 shown in FIG. 2 have been removed.

As shown in FIG. 3, in the vehicle 100, the charger 110, the DC/DC converter 114, the EV controller 120, and the junction box 150 (wiring (wire harness) relay box), all of which are high-voltage electrical components, are disposed on a floor panel 148 constituting the vehicle floor. A cooling fan/duct 152 for air cooling is also provided.

Since the charger 110, the DC/DC converter 114, the EV controller 120, and the junction box 150 are of course located inside the vehicle, it would be difficult to conceive that they would be infiltrated by a large amount of water from the outside. However, the vehicle 100 is two-seater (having only a driver seat and a passenger seat) commercial vehicle, and is configured such that a large amount of cargo can be loaded behind the driver seat and the passenger seat. With this vehicle 100, it is possible for water to spill from the loaded cargo and drip from above onto the high-voltage electrical components on the floor panel 148, and therefore a sufficient countermeasure needs to be provided.

In view of this, the protective structure 130 of the present embodiment is applied as shown in FIG. 2. The protective structure 130 includes a lid 132. The protective structure 130 further includes the front panel 138, the rear panel 140, the pair of side panels 142 and 144, and the center panel 146, all arranged around the lid 132 The high-voltage electrical components are surrounded by the lid 132 and the panels 138, 140, 142, 144 and 146. The front panel 138, the rear panel 140, and the pair of side panels 142 and 144 are disposed on the floor panel 148. The lid 132 is a lid that covers the high-voltage electrical components from above, and in this embodiment the lid 132 is constituted by two sub lids 134 and 136 that are arranged in the vehicle width direction. The front panel 138, the rear panel 140, the pair of side panels 142 and 144, and the center panel 146 are parallel to upper faces 134a and 136a of the sub lids 134 and 136. Note that a configuration is possible in which the center panel 146 is not provided, and a substantially quadrangular one-piece lid is provided in the center of the front panel 138, the rear panel 140, and the pair of side panels 142 and 144 in a plan view.

The sub lids 134 and 136, the front panel 138, the rear panel 140, the pair of side panels 142 and 144, and the center panel 146 are formed from a metal material in this case. Also, the center panel 146 is supported by a substantially cuboid metallic stiffener 154 (see FIG. 3) disposed on the floor panel 148. This enables ensuring sufficient strength and enables ensuring durability with respect to the load that the panels 138, 140, 142, 144 and 146 are subjected to from above. Cargo can therefore also be loaded onto the panels 138, 140, 142, 144 and 146 without any problems, similarly to the floor panel 148 (i.e., the top of these parts can be used as a dummy floor).

Figure 4A:
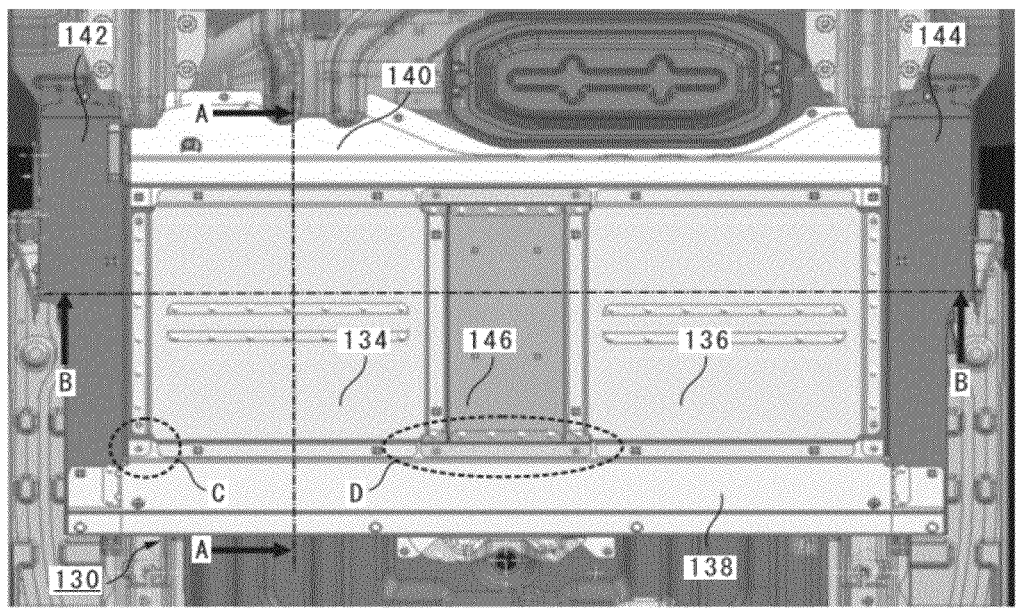
FIGS. 4A and 4B are top views respectively showing states in which the sub lids shown in FIG. 2 are attached and removed.
Figure 4B:
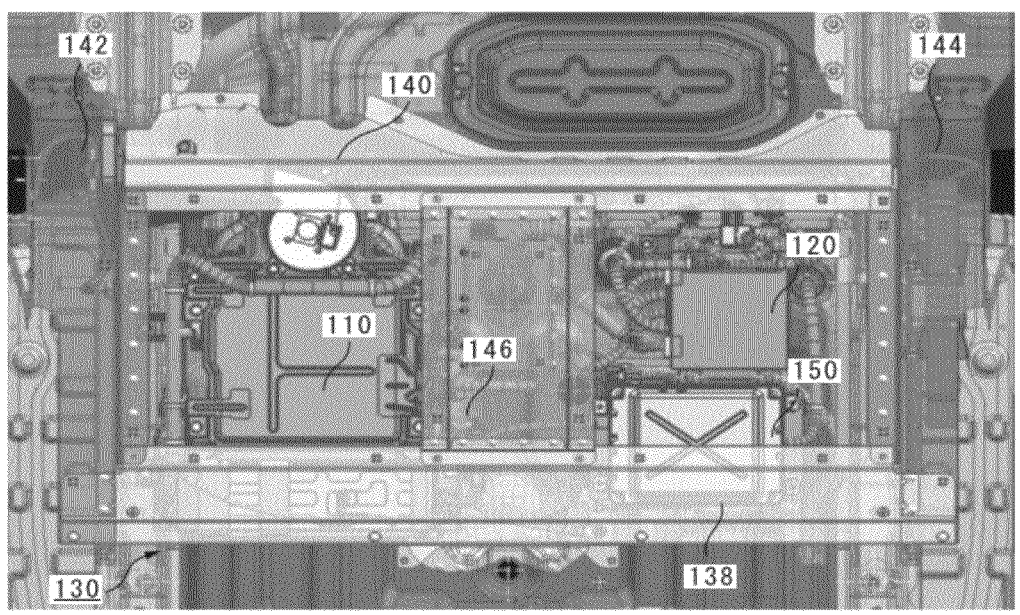

FIGS. 4A and 4B are top views respectively showing states in which the sub lids 134 and 136 shown in FIG. 2 are attached and removed. FIG. 4A is a top view showing the state in which the sub lids 134 and 136 are attached, and FIG. 4B is a top view showing the state in which the sub lids 134 and 136 have been removed. As shown in FIGS. 4A and 4B, the sub lids 134 and 136 are removed when inspecting and repairing the high-voltage electrical components. Certain high-voltage electrical components can be inspected and repaired by removing only whichever one of the sub lids 134 and 136 needs to be removed. This also ensures ease of work in inspection and repair.

Figure 5:
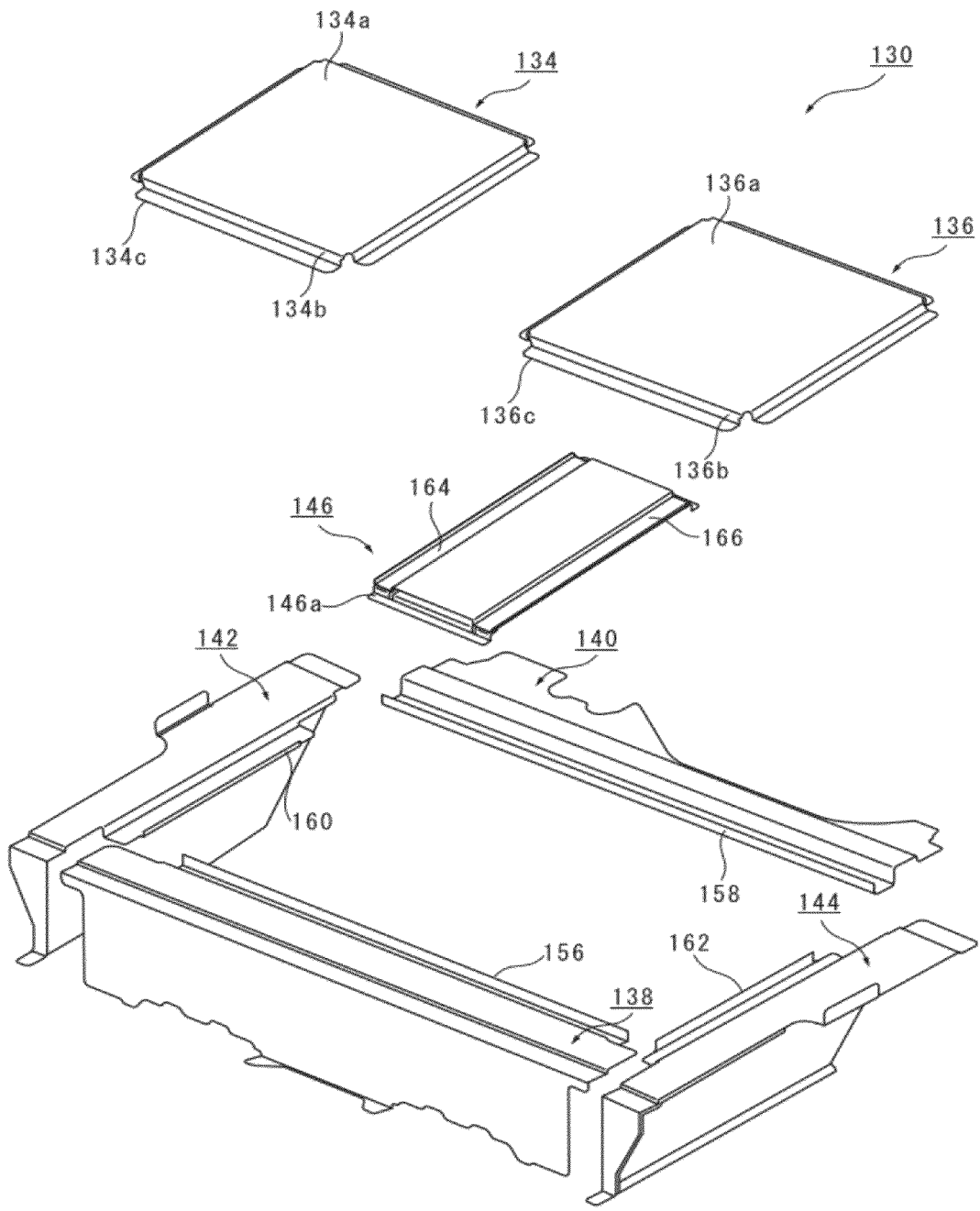
FIG. 5 is an exploded perspective view of the sub lids, the front panel, the rear panel, the pair of side panels, and the center panel shown in FIG. 2.

FIG. 5 is an exploded perspective view of the sub lids 134 and 136, the front panel 138, the rear panel 140, the pair of side panels 142 and 144, and the center panel 146 shown in FIG. 2. As shown in FIG. 5, the sub lids 134 and 136 are substantially quadrangular in a plan view. Specifically, the sub lids 134 and 136 are quadrangular with their four corners removed in a plan view, and have upper faces 134a and 136a, side faces 134b and 136b on the four sides of the upper faces 134a and 136a, and attachment faces 134c and 136c that extend outward parallel to the upper faces 134a and 136a from the lower ends of the side faces 134b and 136b. In other words, the front/rear/left/right attachment faces 134c and 136c are not connected to each other. Note that with the sub lids 134 and 136, reference signs have been given to only one side face 134b and 136b and one attachment face 134c and 136c as representatives among the four of each in this figure.

The front panel 138 has a gutter-shaped edge (hereinafter, referred to as a "gutter-shaped part 156") that extends in the vehicle width direction along the front end of the sub lids 134 and 136. The rear panel 140 has a gutter-shaped edge (hereinafter, referred to as a "gutter-shaped part 158") that extends in the vehicle width direction along the rear end of the sub lids 134 and 136. The pair of side panels 142 and 144 have gutter-shaped edges (hereinafter, referred to as "gutter-shaped parts 160 and 162") that extend in the vehicle front/rear direction along the outer side ends of the sub lids 134 and 136. The center panel 146 has two gutter-shaped side ends (hereinafter, referred to as "gutter-shaped parts 164 and 166") that extend in the vehicle front/rear direction along the inner side ends of the sub lids 134 and 136.

The center panel 146 furthermore has front and rear attachment faces 146a (only one of which is given a reference sign as a representative in the drawing) that have substantially the same shape as the front and rear attachment faces 134c and 136c of the sub lids 134 and 136. The attachment faces 146a of the center panel 146 are different from the attachment faces 134c and 136c of the sub lids 134 and 136 in that the four corners of the center panel 146 have not been removed. The gutter-shaped parts 164 and 166 of the center panel 146 extend to the attachment faces 146a and are connected to the attachment faces 146a (e.g., see FIG. 8). As shown in FIG. 2, the gutter-shaped part 156 of the front panel 138, the gutter-shaped part 158 of the rear panel 140, and the gutter-shaped parts 160 and 162 of the pair of side panels extend to positions immediately before positions where they would intersect (to portions where the panels join together).

Note that there is not necessarily a need for the center panel 146 and the pair of side panels 142 and 144 to each be constituted from a single sheet of metal. In the case where forming each of them from a single sheet of metal requires time-consuming press work such as squeezing, they may be realized as composite parts formed by welding multiple members together.

Figure 7A:
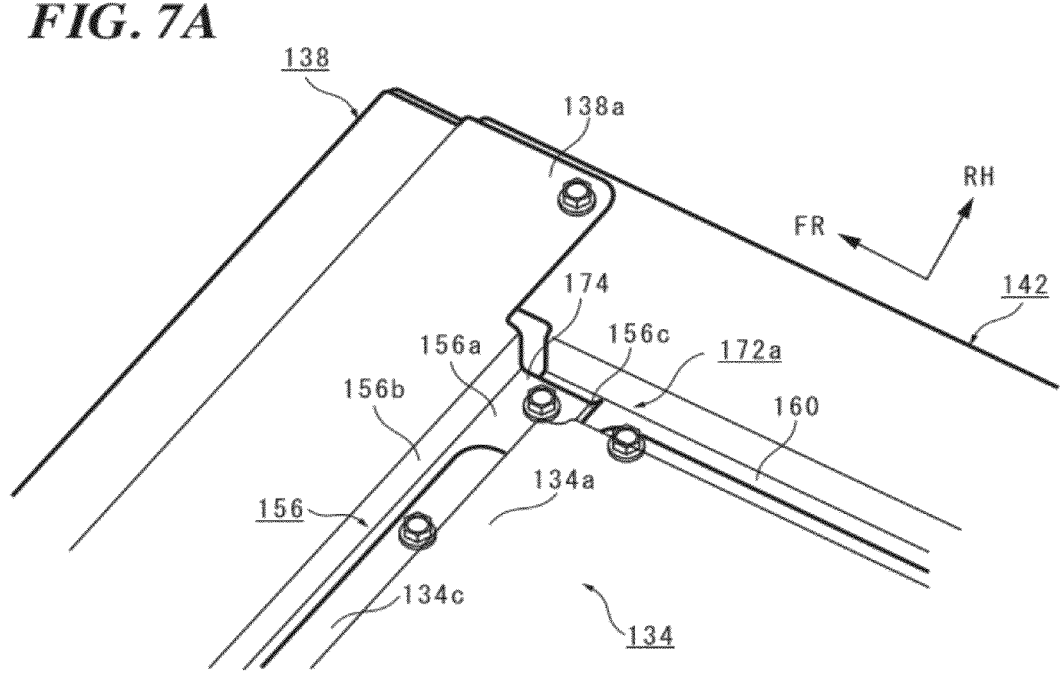
FIGS. 7A and 7B are enlarged views of a range C in FIG. 4A.
Figure 7B:
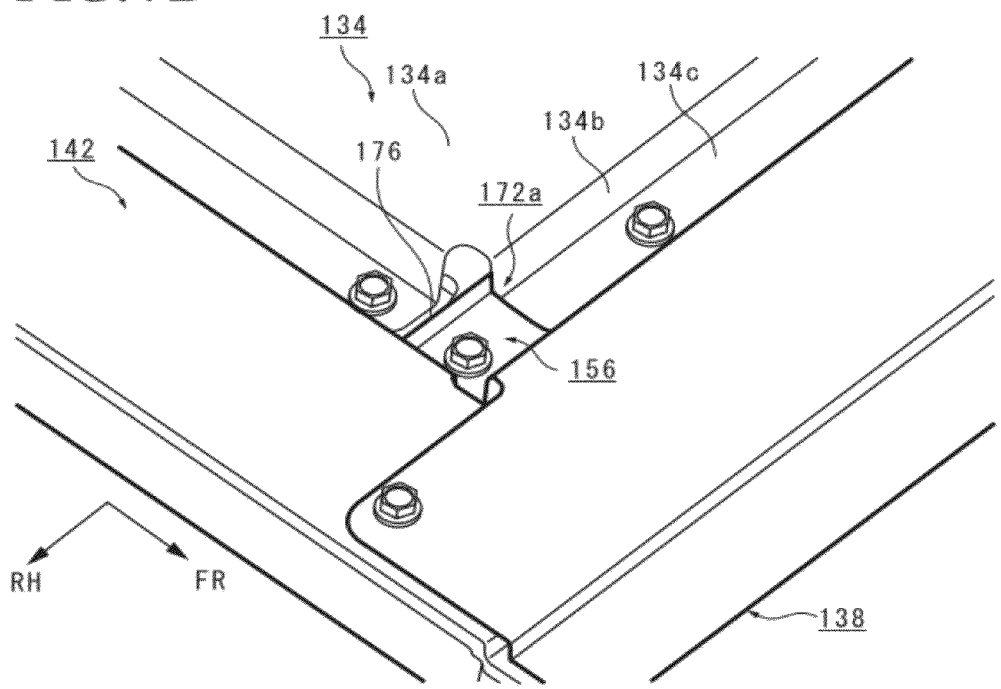
Figure 8:
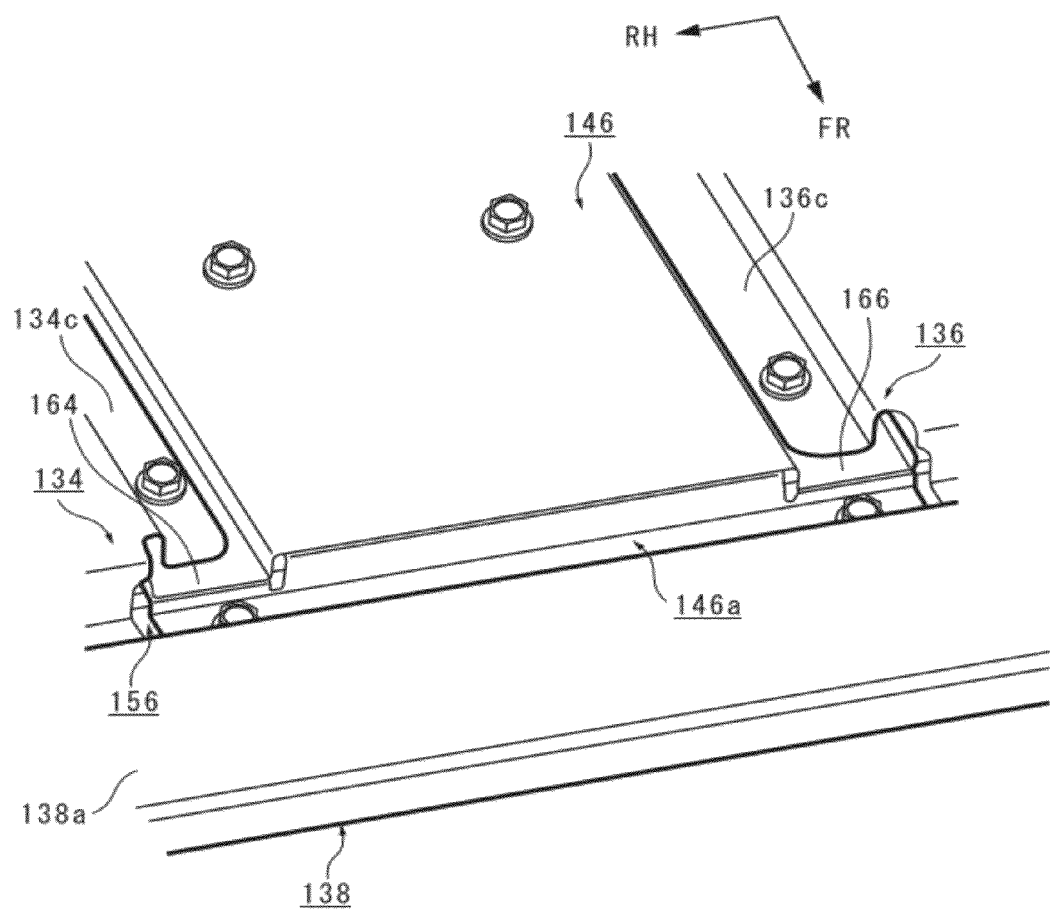
FIG. 8 is an enlarged view of a range D in FIG. 4A.

FIGS. 6A and 6B are a cross-sectional view taken along A-A and a cross-sectional view taken along B-B in FIG. 4A, where FIG. 6A is the cross-sectional view taken along A-A and FIG. 6B is the cross-sectional view taken along B-B. FIGS. 7A and 7B are enlarged views of a range C in FIG. 4A from mutually different angles. FIG. 8 is an enlarged view of a range D in FIG. 4A. Note that the front panel 138, the side panel 142, and the center panel 146 have been hatched in FIGS. 7A, 7B, and 8 in order to facilitate understanding.

Since the gutter-shaped parts 156 to 166 have similar shapes, the following describes the gutter-shaped part 156 of the front panel 138 as a representative. As shown in FIGS. 6A and 7A, the gutter-shaped part 156 is configured by a gutter bottom face 156a and gutter side faces 156b and 156c that respectively rise up from the two ends of the gutter bottom face 156a. The upper end of the outer gutter side face 156b is connected to a panel upper face 138a.

As shown in FIG. 8, the gutter-shaped parts 164 and 166 of the center panel 146 are fixed so as to be layered underneath the inner attachment faces 134c and 136c of the sub lids 134 and 136. The gutter-shaped part 156 of the front panel 138 is fixed so as to be layered underneath the front attachment face 146a of the center panel 146 and the front attachment faces 134c and 136c of the sub lids 134 and 136. Similarly to the front panel 138, the gutter-shaped part 158 of the rear panel 140 is fixed so as to be layered underneath the rear attachment face 146a of the center panel 146 and the rear attachment faces 134c and 136c of the sub lids 134 and 136.

As shown in FIGS. 7A and 7B, the gutter-shaped parts 160 and 162 of the side panels 142 and 144 are fixed so as to be layered underneath the outer attachment faces 134c and 136c of the sub lids 134 and 136. The side panels 142 and 144 themselves are fixed so as to be layered underneath the front panel 138 and the rear panel 140. Note that fixing is performed using bolts or the like.

According to the above configuration, water from above is obstructed by the sub lids 134 and 136, and that water flows to the gutter-shaped parts 156 to 166 that support the periphery of the sub lids 134 and 136. The attachment faces 134c and 136c of the sub lids 134 and 136 are fixed so as to be housed inside the gutter-shaped parts 156 to 166 (so as to be connected to the gutter bottom faces 156a), and therefore the water can be reliably guided to the gutter-shaped parts 156 to 166. Note that with this configuration, the gutter-shaped parts 164 and 166 and the attachment faces 146a of the center panel 146 are connected to each other, and water that has flowed to the gutter-shaped parts 164 and 166 reliably flows to the gutter-shaped part 156 of the front panel and the gutter-shaped part 158 of the rear panel that house the attachment faces 146a.

Accordingly, the water obstructed by the sub lids 134 and 136 can be drained to trouble-free positions not directly above the high-voltage electrical components via the gutter-shaped parts 156 to 166 of the various panels. FIG. 2 shows water draining paths 170 and water draining locations 172a, 172b, 172c, and 172d in the protective structure 130. Water flowing in the gutter-shaped parts 156 to 166 is drained to the floor panel 148 therebelow from the water draining locations 172a to 172d. Note that although the gutter-shaped parts 156 to 166 of the various panels are not tilted in this case, they may be tilted such that the obstructed water flows to the water draining locations 172a to 172d.

As described above, the gutter-shaped parts 156 to 162 extend to positions immediately before positions where they would intersect (to portions where the panels join together). Accordingly, the water draining locations 172a, 172b, 172c, and 172d are respectively locations diagonally forward and rightward, diagonally forward and leftward, diagonally rearward and rightward, and diagonally rearward and leftward with respect to the sub lids 134 and 136, and water draining openings 174 and 176 of the two gutter-shaped parts 156 and 160 are provided at the water draining location 172a (see FIGS. 7A and 7B). By setting the water draining openings 174 and 176 of the gutter-shaped parts 156 to 162 at the portions where the panels join together in this way, the water draining openings 174 and 176 can be positioned as far away as possible from a position directly above the high-voltage electrical components, without leading to unnecessary enlargement in terms of the layout.

As shown in FIGS. 6A and 6B, the protective structure 130 includes base parts 178 and 180, and the high-voltage electrical components are supported by the base parts 178 and 180 so as to be at positions higher than the floor panel 148. Accordingly, even if water is drained to the floor panel 148 therebelow, it is possible to avoid a situation in which the lower sides of the high-voltage electrical components are exposed to water. Note that water that falls to the floor panel 148 is drained by flowing to the outside (mainly to the front) of the protective structure 130 due to beads formed in the floor panel 148.

As described above, according to the protective structure 130 of the present embodiment, it is possible to prevent the infiltration of water from above and reliably protect high-voltage electrical components such as the charger 110, the DC/DC converter 114, the EV controller 120, and the junction box 150. Also, as a result of applying the protective structure 130, the high-voltage electrical components are normally separated from the outside (the sub lid 134 or 136 is removed only if necessary when performing inspection and repair), and thus the protective structure 130 is a countermeasure against not only water, but dust as well.

Although a preferred embodiment of the present invention has been described above with reference to the accompanying drawings, the present invention is, needless to say, not intended to be limited to this example. A person skilled in the art could clearly arrive at various variations and modifications within the range of the recitation of the claims, and all such various and modifications are of course understood to also fall within the technical scope of the invention.

The present invention is applicable as a protective structure for vehicle electrical components for protecting electrical components mounted on the vehicle floor.

What is claimed is:

1. A protective structure for vehicle electrical components for protecting an electrical component mounted on a vehicle floor, the protective structure for vehicle electrical components comprising:
   a lid that covers the electrical component from above; and
   one or more panels that are arranged around the lid and parallel to an upper face of the lid;
   wherein the one or more panels each has a gutter-shaped edge that supports the periphery of the lid;

wherein the lid has side faces on sides of the upper face, and attachment faces that extend outward parallel to the upper face from lower ends of the side faces; and wherein the gutter-shaped edge of each of the one or more panels is fixed so as to be layered underneath the attachment faces of the lid.

2. The protective structure for vehicle electrical components according to claim 1, comprising:

two or more of the panels;

wherein the gutter-shaped edge of each of the two or more panels has a water draining opening in a portion where the two or more panels join together.

3. The protective structure for vehicle electrical components according to claim 1, wherein:

the lid is substantially quadrangular in a plan view; and the one or more panels include a front panel having a gutter-shaped edge that extends in a vehicle width direction along a front end of the lid, a rear panel having a gutter-shaped edge that extends in the vehicle width direction along a rear end of the lid, and a pair of side panels each having a gutter-shaped edge that extends in a vehicle front/rear direction along a side end of the lid.

4. The protective structure for vehicle electrical components according to claim 3, wherein:

the lid includes two sub lids that are arranged in the vehicle width direction;

the two sub lids each have an upper face, side faces on four sides of the upper face, and attachment faces that extend outward parallel to the upper face from lower ends of the side faces;

the protective structure for vehicle electrical components further comprises a center panel, the center panel having two gutter-shaped side edges that extend in the vehicle front/rear direction and are layered underneath the inner attachment faces of the two sub lids, and front and rear attachment faces having shapes substantially the same as the front and rear attachment faces of the two sub lids; and the gutter-shaped edge of each of the one or more panels is fixed so as to be layered underneath the attachment faces of the two sub lids and the center panel.

5. The protective structure for vehicle electrical components according to claim 4, wherein:

the lid, the front panel, the rear panel, the pair of side panels, and the center panel are formed from a metal material; and the protective structure for vehicle electrical components further comprises a stiffener that is disposed on the vehicle floor and supports the center panel.

6. The protective structure for vehicle electrical components according to claim 1, wherein the protective structure for vehicle electrical components further comprises a base part that supports the electrical component so as to be at a position higher than the vehicle floor.

7. The protective structure for vehicle electrical components according to claim 1, wherein:

the vehicle is an electric automobile, a hybrid electric vehicle, or a plug-in hybrid electric vehicle; and the electrical component is a high-voltage electrical component that operates using high voltage for motor driving.

8. A protective structure for vehicle electrical components for protecting an electrical component mounted on a vehicle floor, the protective structure for vehicle electrical components comprising:

a lid that covers the electrical component from above; and two or more panels that are arranged around the lid and parallel to an upper face of the lid;

wherein the two or more panels are each integrally formed to have a gutter-shaped edge that supports the periphery of the lid;

wherein the gutter-shaped edge of each of the two or more panels has a water draining opening in a portion where the two or more panels join together;

wherein the lid is substantially quadrangular in a plan view;

wherein the two or more panels include a front panel having a gutter-shaped edge that extends in a vehicle width direction along a front end of the lid, a rear panel having a gutter-shaped edge that extends in the vehicle width direction along a rear end of the lid, and a pair of side panels each having a gutter-shaped edge that extends in a vehicle front/rear direction along a side end of the lid;

wherein the lid has side faces on four sides of the upper face, and attachment faces that extend outward parallel to the upper face from lower ends of the side faces; and wherein the gutter-shaped edge of each of the two or more panels is fixed so as to be layered underneath the attachment faces of the lid.

9. The protective structure for vehicle electrical components according to claim 8, wherein:

the lid includes two sub lids that are arranged in the vehicle width direction;

the two sub lids each have an upper face, side faces on four sides of the upper face, and attachment faces that extend outward parallel to the upper face from lower ends of the side faces;

the protective structure for vehicle electrical components further comprises a center panel, the center panel having two gutter-shaped side edges that extend in the vehicle front/rear direction and are layered underneath the inner attachment faces of the two sub lids, and front and rear attachment faces having shapes substantially the same as the front and rear attachment faces of the two sub lids; and the gutter-shaped edge of each of the two or more panels are fixed so as to be layered underneath the attachment faces of the two sub lids and the center panel.

10. The protective structure for vehicle electrical components according to claim 9, wherein:

the lid, the front panel, the rear panel, the pair of side panels, and the center panel are formed from a metal material; and the protective structure for vehicle electrical components further comprises a stiffener that is disposed on the vehicle floor and supports the center panel.

11. The protective structure for vehicle electrical components according to claim 8, wherein the protective structure for vehicle electrical components further comprises a base part that supports the electrical component so as to be at a position higher than the vehicle floor.

12. The protective structure for vehicle electrical components according to claim 8, wherein:

the vehicle is an electric automobile, a hybrid electric vehicle, or a plug-in hybrid electric vehicle; and the electrical component is a high-voltage electrical component that operates using high voltage for motor driving.

13. The protective structure for vehicle electrical components according to claim 8, wherein the two or more panels are removable without removing the lid.

14. The protective structure for vehicle electrical components according to claim 1, wherein the one or more panels are removable without removing the lid.

* * * * *